United States Patent Office
3,400,910
Patented Sept. 10, 1968

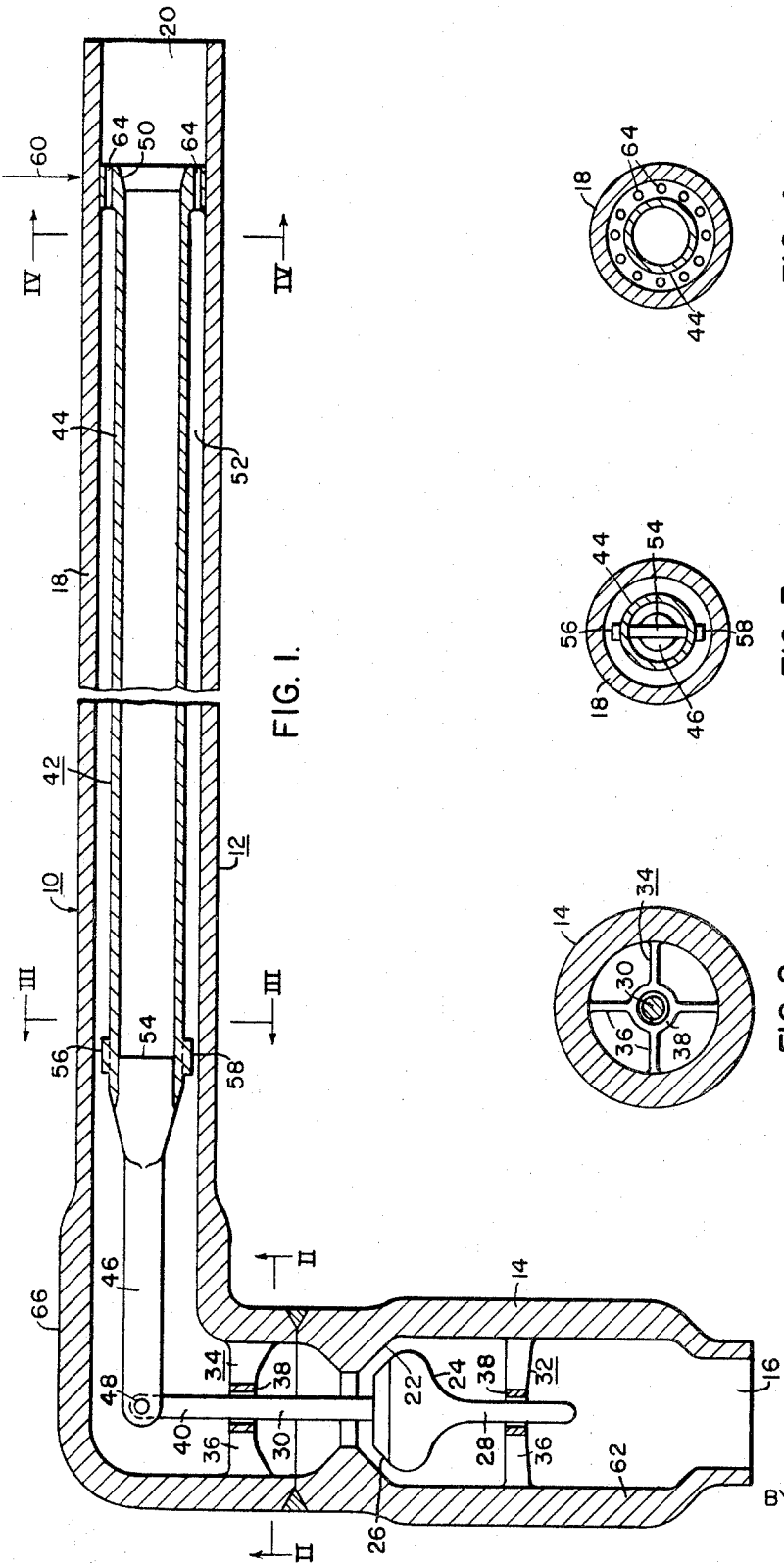

3,400,910
HERMETICALLY SEALED VALVE
Harold O. Blinn, Monroeville, Pitcairn, Pa., assignor to Westinghouse Electric Corporation, Pittsburgh, Pa., a corporation of Pennsylvania
Filed Feb. 24, 1966, Ser. No. 529,793
8 Claims. (Cl. 251—342)

The present invention is directed generally to a new and improved valve arrangement and more particularly to a valve for use in a hermetically sealed flow system.

Hermetically sealed in-line valves normally utilize a bellows arrangement for transmitting motion into a hermetically sealed system from the exterior. For certain applications, for example for a liquid metal system such as liquid cesium, potassium, or sodium, it is necessary to form a valve from a refractory material in view of the corrosive and erosive effects of a high temperature liquid metal on the more common materials. The construction of a bellows from a refractory metal is extremely difficult and the reliability of such bellows over the lifetime of the system is questionable. In addition in a bellows system, there is normally an isolated area where liquid metals oxides can collect. Such areas desirably are avoided by proper valve design.

Accordingly, it is an object of this invention to provide a new and improved hermetically sealed in-line valve which can be easily fabricated from refractory materials.

A further object of this invention is to provide a new and improved hermetically sealed valve which avoids the use of a bellows for motion translating.

A further object of this invention is to provide a new and improved hermetically sealed in-line valve of simplified construction.

Briefly, the present invention accomplishes the above cited objects by providing a valve which is substantially built into the fluid conduit. The valve housing comprises a conduit having a pair of laterally extending sections with the valve seat, valve disc, and valve disc guide means positioned in one of the two laterally extending conduits. The valve operator is formed in the other relatively longer conduit and comprises an operating member for example of tubular configuration mounted concentrically within the other conduit section and joined thereto at and end remote from the one conduit section. The tubular operator desirably is formed to be extremely long and is formed with a pivot point thereon positioned intermediate the fixed end of the valve operating member and the one conduit section. The other end of the valve operator desirably extends to a position aligned with the axis of the first valve section and is pivotally secured to the valve disc. Desirably, the pivot point is substantially closer to the free end of the valve operating member than to the fixed end thereof. By forming the valve operating member and the other pipe section of a sufficient length, it will be appreciated that there exists in the piping a sufficient amount of lateral play to permit the excursion of a force on the fixed end of the valve operating member which causes movement thereof in an amount sufficient to move the valve disc from an open position spaced from the valve seat to a closed position in engagement with the valve seat. More particularly, the valve operating member operates as a first class lever which pivots about the pivot point to move the free end of the valve operating member in the direction which causes movement of the valve disc into engagement with the valve seat. Desirably, the valve disc supporting means is formed to permit substantial unobstructed flow therethrough when the valve disc is not in its seated position and similarly the valve operating member is formed with flow passageways extending through the center of the annular operating member as well as flow passageways which permit straight line fluid flow in the annular region between interior wall of the other pipe section and the valve operating member. In this manner, there are no isolated areas of zero flow where liquid metal oxides can collect.

These and other objects and advantages of the present invention will become more apparent when considering the following detailed description and drawings, in which:

FIGURE 1 is a longitudinal sectional view through a valve constructed in accordance with the principles of this invention; and FIGS. 2, 3 and 4 are transverse sectional views of the valve of FIG. 1 and taken respectively along the lines II—II, III—III and IV—IV thereof.

Referring to the drawings, an in-line valve 10 constructed in accordance with the principles of this invention includes a tubular housing 12 constructed substantially of the same size as the piping to which it is adapted to be secured and having a generally L-shaped cross-section. Housing 12 comprises a relatively short leg 14 having a flow inlet 16 formed in one end thereof and a relatively long leg 18 joined to and extending substantially perpendicularly from leg 14 and having an outlet formed in the outer end 20 thereof. Leg 14 is formed with a valve seat 22 on the inner periphery thereof which in this example faces inlet 16. A valve disc 24 is positioned centrally of leg 14 and includes a seating surface 26 thereon sized to engage flushly seat 22 to arrest flow through valve 10. Valve member 24 is positioned intermediate seat 22 and inlet 16 and includes a pair of stub shafts 28 and 30 extending outwardly therefrom in opposite directions. A pair of guide members 32 and 34 are formed in leg 14 positioned on opposite sides of seat 22 and each includes a plurality of radially extending spokes 36 which extend from the inner walls of legs 14 to support a central annular hub 38. The stub shafts 28 and 30 pass through the central openings in hubs 38 of guide members 32 and 34, respectively. The free end 40 of upper stub shaft 30 extends upwardly to a position in alignment with the opening in housing leg 18 and is pivotally secured to the free end of a valve operating member 42. The valve operating member 42 is elongated and extends substantially the entire length of leg 18 and includes an elongated annular segment 44 which is joined to a relatively shorter rod-like segment 46 adjacent leg 14. The rod-like segment 46 is pivotally secured to end 40 of stub shaft 30 by suitable means such as pivot pin 48. The end of annular segment 44 remote from leg 14 is flared outwardly at 50 and fixedly secured to the inner surface of leg 18 by suitable means as by welding. The flared section 50 of valve operating member 42 positions the latter substantially concentrically within leg 18 to form an annular flow region 52 between annular segment 44 and the interior surface of leg 18. The rod-like segment 46 of operating member 42 is provided with a flattened end 54 which projects into the adjacent end of annular segment 44 and is of a smaller cross-section than the latter end to provide flow openings 56 (FIG. 3) which afford communication between the interior of annular segment 44 and the remainder of housing 12. A pair of outwardly extending projections 56 and 58 extend respectively upwardly and downwardly from that end of segment 44 located adjacent leg 14 and extend toward, yet are slightly spaced from the adjacent wall portion of leg 18. Projections 56 and 58 serve as pivot points to effect opening and closing movement of the valve 10, as will be explained.

Pivot points 56 and 58 are substantially closer to pivot pin 48 than to fixed flared end 50 of operating member so that lateral movement of flared end 50 in the direction of arrow 60 (downwardly) causes pivot point 56 to engage the inner surface of leg 18 and simultaneously causes lateral displacement of pivot pin 48 upwardly in the direction opposite the direction of arrow 60. Such upward movement of pivot pin 48 moves valve disc 24 toward seating engagement with valve seat 22. It will therefore be seen that valve operating member 42 acts as a first class lever pivoting about a fulcrum at 56 with a mechanical advantage proportional to the ratio of the lengths of segments 44 and 46.

In piping systems wherein long lengths of pipe are used, there is normally sufficient elasticity in such pipe lengths to permit some elastic lateral displacement adjacent the midpoint of the pipe length. The present invention takes advantage of such elasticity to effect opening and closing of valve 10. Accordingly when segment 44 is mounted in a sufficiently long piping section and is of itself sufficiently long, the end 50 of the operating member 42 can move pivotally in a lateral direction upon lateral displacement of an adjacent section of leg 18 to cause sufficient movement to seat disc 24 against seat 22 to close valve 10. Thus a hermetically sealed in-line valve is achieved by this invention as inlet and outlet ends 16 and 20 of housing 12 may be hermetically secured to adjacent piping segments in a flow loop. In order to reduce the pressure drop across valve 10, housing 12 is flared at 62 to provide sufficient cross-sectional area in leg 14 to compensate for valve disc 24. Very little pressure drop is created by guide members 32 and 34 by virtue of their spoked configuration. Similarly, projections 56 and 58 do not substantially increase the pressure drop across valve 12 as they are circumferentially spaced. Flow openings 56 permit flow through the interior of annular segment 44 and the flared end 50 of segment 44 is provided with circumferentially spaced flow openings 64 therein to permit flow in the annular region 52.

Since lateral displacement of leg 18 adjacent arrow 60 causes pivotal movement of leg 18 about that region of housing 12 adjacent the junction of legs 14 and 18, housing 12 desirably is re-enforced thereadjacent as indicated by the thickened area 66.

In the event binding occurs causing the sticking of seating surface 26 to seat 22, lateral movement of leg 18 at arrow 60 but in the opposite or, in this example, upward direction, will cause pivotal movement of valve operating member 42 about lower pivot point 58 to move pivot pin 48 and valve disc 24 downwardly away from seat 22 with the mechanical advantage inherently built into valve 10 to open the valve.

From the foregoing, it will be appreciated that many modifications may be made to the embodiment of this invention described in detail herein without departing from the broad spirit and scope of this invention. For example, seat 22 may be positioned between disc 24 and inlet 16 with seating surface 22 facing inlet 16 and normally seated on the valve seat to form a normally closed valve which is opened upon downward lateral displacement of leg 18 adjacent arrow 60. In addition, the pivotal arrangement employing pivot pin 48 may be replaced by another form of motion translating means, for example, a rack and pinion which causes movement of the valve disc 24 toward or away from seat 22 upon rotation or twisting of casing section 18 in the region adjacent arrow 60. Accordingly, it is specifically intended that this embodiment be interpreted as illustrative of this invention and not as limitative thereof.

I claim as my invention:

1. A valve comprising a tubular outer casing having a first section extending laterally from an elongated second casing section, said casing having an inlet and outlet formed respectively in said casing sections and a flow path between said inlet and outlet passing serially through said first and second casing sections, a valve seat formed in said first section, a valve disc located in said first section and mounted for movement toward and away from seating engagement with said valve seat, an elongated operating member connected at one end to said valve disc and extending into said second casing section, means fixedly securing the other end of said operating member to said second casing section at a position thereon remote from said first casing section, and said second casing section being formed from a material which permits substantial elastic lateral displacement of said remote position thereon, said operating member being connected to said valve disc to move said valve disc either toward or away from seating engagement with said valve seat upon lateral displacement of said remote position.

2. The valve of claim 1 wherein said valve operator is formed with a pivot point therein which engages said casing upon lateral displacement of said casing to move said valve operator pivotally about said pivot point.

3. The valve of claim 2 wherein said pivot point is positioned substantially closer to said first casing section than to said remote position.

4. The valve of claim 1 wherein said valve operator includes a tubular section mounted substantially concentrically of said second casing section, said tubular section being flared outwardly flared at one end thereof and secured at said one end to said second casing section at said remote position thereof and said flared end having at least one flow opening formed therein.

5. The valve of claim 1 wherein said valve operating member includes at least one stub shaft secured to said valve disc and extending within said first casing section toward said second casing section and said valve operating member including an elongated lever located in said second casing section, said lever being pivotally secured at one end to said stub shaft and fixedly secured at the other end to said casing.

6. The valve of claim 5 wherein said lever is provided with a fulcrum thereon positioned to engage said casing upon lateral displacement of said remote position of said second casing member, said fulcrum being positioned substantially closer to said one lever end than to said other lever end.

7. The valve of claim 5 wherein guide means are formed in said first casing member surrounding said stub shaft.

8. A valve comprising a tubular outer casing having a first section extending laterally from an elongated second casing section, said casing having an inlet and outlet formed respectively in said casing sections and a flow path between said inlet and outlet passing serially through said first and second casing sections, a valve seat formed in said first section, a valve disc located in said first section and mounted for movement toward and away from seating engagement with said valve seat, an elongated operating member connected at one end to said valve disc and extending into said second casing section, means fixedly securing the other end of said operating member to said second casing section at a position thereon remote from said first casing section, and said second casing section being formed from a material which permits substantial elastic movement of said casing adjacent said remote position on said second casing section, said operating member being coupled to said valve disc and to said second casing to effect movement of said valve disc either toward or away from seating engagement with said valve seat upon elastic movement of said casing adjacent said remote position.

References Cited
UNITED STATES PATENTS

| | | | |
|---|---|---|---|
| 703,103 | 6/1902 | Weber | 251—354 XR |
| 3,003,526 | 10/1961 | Bell | 251—342 XR |
| 3,086,545 | 4/1963 | Howard | 251—342 XR |
| 3,120,373 | 2/1964 | Medicus | 251—335 XR |
| 3,288,433 | 11/1966 | Nelson | 251—339 XR |

SAMUEL SCOTT, *Primary Examiner.*